United States Patent Office 3,007,947
Patented Nov. 7, 1961

3,007,947
17β-HYDROXYESTR-1-EN-3-ONES AND
DERIVATIVES THEREOF
Raymond E. Counsell, Evanston, Ill., assignor to G. D. Searle & Co., Chicago, Ill., a corporation of Delaware
No Drawing. Filed Dec. 29, 1959, Ser. No. 862,496
5 Claims. (Cl. 260—397.4)

The present invention relates to certain 17β-hydroxyestr-1-en-3-ones and derivatives thereof and more particularly to the compounds of the general structural formula

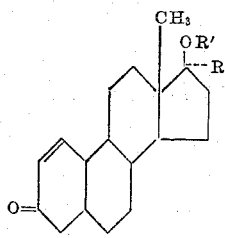

wherein R is either hydrogen or a lower alkyl radical and wherein R' is either hydrogen or a lower alkyl-CO radical. In the foregoing structural formula the lower alkyl radicals in the 17-position are preferably methyl, ethyl, propyl, or butyl. The radical R' is an acyl radical derived from an acid R'—COOH which can be formic, acetic, propionic, butyric, isobutyric, pentanoic, hexanoic acid and the like.

The compounds of this invention have valuable hormonal properties which distinguish them from the corresponding 10-methyl homologs as well as from the Δ⁴-isomers. They are anabolic, androgenic, and progestational agents. It is interesting to note that the compounds in which R is hydrogen have a greater anabolic and androgenic activity than the corresponding 10-methyl homologs; unlike their Δ⁴-isomers they are less antiestrogenic. The compounds in which R is a lower alkyl group have a progestational activity greater than that of the 10-methyl derivatives; these compounds are also less anti-estrogenic than the corresponding Δ⁴-isomers.

The compounds of this invention are conveniently prepared using as the starting materials the corresponding compound of the formula

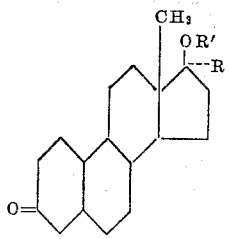

These estrane compounds can be converted to their 2-bromo derivatives by treatment with bromine. Where R is hydrogen the preferred solvent is an alkanoic acid such as acetic acid while, where R is an alkyl group, dimethylformamide is the preferred medium. The resulting 2-bromo compound is subjected to dehydrohalogenation using either a lithium salt in dimethylformamide or a pyridine derivative, typically collidine, as dehydrohalogenation agent.

The compounds which constitute this invention and the methods for their preparation will appear more fully from the consideration of the following examples which are given for the purpose of illustration only and are not to be construed as limiting the invention in spirit or in scope. In these examples quantities are indicated as parts by weight.

Example 1

A solution of 2.45 parts of 17β-hydroxy-5α,10β-estran-3-one in 20 parts of pyridine and 2.2 parts of acetic anhydride is permitted to stand at room temperature for 12 hours and then poured into ice water. The resulting precipitate is collected on a filter, washer successively with water, dilute hydrochloric acid, and 5% aqueous sodium bicarbonate solution and allowed to dry. The resulting precipitate is recrystallized from aqueous methanol to yield 17β-acetoxy-5α,10β-estran-3-one melting at about 104–106° C.

A solution of 8 parts of this compound in 63 parts of glacial acetic acid is cooled in an ice water bath and 25 parts of a 2-N solution of bromine in acetic acid are added portionwise with stirring. Agitation at room temperature is continued for 15 minutes longer while nitrogen is caused to bubble through the reaction mixture. The mixture is then poured slowly into ice water and the resulting product is separated by filtration. After washing with water and 5% aqueous sodium bicarbonate, the residue, containing 2-bromo-17β-acetoxy-estran-3-one, is dissolved in ether and the solution is dried over anhydrous magnesium sulfate. After removal of the solvent, the residue is refluxed in 30 parts of collidine for 15 minutes. Then 175 parts of ether are added to the cooled reaction mixture and the contents are washed successively with water, 2-N-hydrochloric acid, 5% aqueous sodium bicarbonate solution and saturated sodium chloride solution. The ether solution is then dried over anhydrous magnesium sulfate, filtered and evaporated. The resulting residue is dissolved in benzene and adsorbed onto silica gel. The column is developed with benzene solutions containing increasing concentrations of ethyl acetate. Elution with a 4% solution yields first estradiol 17β-acetate and then 17β-acetoxy-5a,10β-estr-1-en-3-one melting at about 133.5–135.5° C. The ultraviolet absorption spectrum shows a maximum at 230 millimicrons with a molecular extinction coefficient of about 10,200. The specific rotation of the chloroform solution $\alpha_D$ is +117°.

By substituting in the foregoing procedure an equivalent amount of propionic anhydride for the acetic anhydride there is thus obtained 17β-propionoxyestr-1-en-3-one.

Example 2

A solution of 16 parts of crude 17β-hydroxy-5β,10β-estran-3-one in 150 parts of glacial acetic acid is warmed on a steam bath. To the warm solution 18.5 parts of pyridine perbromide hydrobromide is added portionwise. Heating on the steam bath is continued for an hour with nitrogen bubbling through the reaction mixture. After cooling the reaction mixture is added slowly to ice water and the resulting solid is collected on a filter and washed with aqueous 5% sodium bicarbonate and water. The product is then dissolved in a mixture of ether and dichloromethane and the solution is dried over anhydrous potassium carbonate. The solvent is stripped to yield a brown crystalline solid which is dissolved in dimethylformamide and lithium chloride. This mixture is placed in an oil bath and maintained at 125–130° C. for 4 hours. The dehydrohalogenation is performed under an atmosphere of nitrogen. After allowing the reaction mixture to cool, 280 parts of ether are added and the solution is washed with 400 parts of 10% hydrochloric acid and water. After drying over anhydrous potassium carbonate and charcoal decloroization, the solvent is removed. The resulting residue is dissolved in benzene and adsorbed onto silica gel. The column is developed with benzene solutions containing increasing concentrations of ethyl acetate. Elution with a 5% solution and concentration of the eluate yields 17β-acetoxy-5β,10β-estr-1-en-3-one which on recrystallization from petroleum ether melts at about 177–118.5° C. The ultraviolet absorption spectrum shows a maximum at 231 millimicrons with a molecular extinction coefficient of about 9,600.

*Example 3*

To a solution of 2 parts of 17β-acetoxy-5α,10β-estr-1-en-3-one in 7.9 parts of methanol and 2 parts of water is added 1 part of potassium hydroxide in flakes and the resulting solution is refluxed for an hour. After cooling the solution is poured slowly into ice water and the resulting precipitate is extracted with ether. The ether extract is washed with water, dried over anhydrous potassium carbonate, and then evaporated. Recrystallization of the residue from a mixture of acetone and petroleum ether yields 17β-hydroxy-5α,10β-estr-1-en-3-one. The ultraviolet absorption spectrum shows a maximum at 229 millimicrons with a molecular extinction coefficient of about 9,800. Infrared maxima are observed at 2.75, 3.4, and 5.95 microns.

*Example 4*

A solution of 3.4 parts of 17β-acetoxy-5β,10β-estr-1-en-3-one is dissolved in 160 parts of methanol. Then 5 parts of potassium bicarbonate in 12.5 parts of water are added and the mixture is refluxed for 4 hours and allowed to cool at room temperature. It is then slowly poured into ice water and, on standing at 0° C., a precipitate is formed which is collected on a filter, washed with water, dilute hydrochloric acid and water, and recrystallized from methanol and water. The 17β-hydroxy-5β,10β-estr-1-en-3-one thus obtained melts at about 140–142° C.

*Example 5*

To a solution of 14.5 parts of 17α-methyl-17β-hydroxy-5α,10β-estran-3-one in 150 parts of dimethylformamide are added 0.2 part of p-toluenesulfonic acid monohydrate. Then there is added portionwise a solution of 8 parts of bromine in 250 parts of dimethylformamide at room temperature with agitation in the course of 12 hours. The reaction mixture is permitted to stand for 12 hours at room temperature and then is poured slowly into ice water. The resulting precipitaate is collected by filtration. After washing with water the residue is dissolved in ether and the resulting solution is dried over anhydrous potassium carbonate. The solvent is removed and the crystalline residue containing 2-bromo-17α-methyl-17β-hydroxy-5α,10β-estrani-3-one is dissolved in 100 parts of dimethylformamide. To this solution are added 3.9 parts of lithium chloride and 2.3 parts of lithium carbonate. The resulting mixture is refluxed with stirring in an atmosphere of nitrogen for 6 hours. The mixture is then permitted to come to room temperature and treated with ether. This ether solution is washed successively with water, dilute hydrochloric acid (1:3), 5% sodium bicarbonate solution, and water. After drying over anhydrous potassium carbonate, the solvent is removed. The resulting residue is dissolved in benzene and applied to a silica gel chromatography column. The column is developed with benzene solutions containing increasing concentrations of ethyl acetate. Elution with a 15% solution of ethyl acetate in benzene, concentration of the eluate and recrystallization of the residue from acetone and petroleum ether yields 17α-methyl-17β-hydroxy-estr-1-en-3-one melting at about 141–142.5° C. The specific rotation $\alpha_D$ is +87° in 1% chloroform solution. An ultraviolet maximum at 229.5 millimicrons has an extinction coefficient of about 10,050. Infrared maxima are observed at about 2.76, 3.4, 5.95, 6.9, and 10.72 microns.

*Example 6*

To a solution of 15.2 parts of 17α-ethyl-17β-hydroxy-5α,10β-estran-3-one in 750 parts of dimethylformamide are added first 0.5 part of the monohydrate of p-toluenesulfonic acid and then, in the course of 24 hours, a solution of 8 parts of bromine in 200 parts of dimethylformamide. The reaction mixture is then poured into a mixture of ice and water and the resulting precipitate is collected on a filter. The product is next washed with aqueous sodium bicarbonate and water. The resulting 2-bromo-17α-ethyl-17β-hydroxy 5α,10β-estran-3-one is dried, dissolved in 90 parts of dimethylformamide and treated with 3.9 parts of lithium chloride and 2.25 parts of lithium carbonate. The resulting mixture is refluxed under an atmosphere of nitrogen for 6 hours. After cooling, water is added and the mixture is extracted with ether. The ether extract is washed with dilute hydrochloric acid (1:3) and water. The ether phase is dried over anhydrous potassium carbonate and the solvent removed. The resulting residue is dissolved in benzene and applied to a silica gel chromatography column. This column is developed with benzene solutions containing increasing concentrations of ethyl acetate. Elution with an 8% solution yields 17α-ethyl-17β-hydroxy-5α,10β-estr-1-en-3-one which, recrystallized from ethyl acetate and petroleum ether, melts at about 170–173° C. The specific rotation of the chloroform solution $\alpha_D$ is +42.4°. The ultraviolet absorption spectrum shows a maximum at about 230 millimicrons with a molecular extinction coefficient of 9,770. Infrared maxima are observed at about 2.74, 3.4, 5.94, 6.9, and 10.29 microns.

*Example 7*

To a solution of 3.2 parts of 17α-ethyl-17β-hydroxy-5α,10β-estr-1-en-3-one in 25 parts of pyridine are added 2.2 parts of acetic anhydride. The resulting solution is refluxed for 6 hours and allowed to cool to room temperature. The solution is then poured slowly into ice water and the resulting precipitate is collected on a filter and dissolved in ether. The ether solution is washed successively with water, 2-N hydrochloric acid, 5% aqueous sodium bicarbonate solution and water. After drying over anhydrous potassium carbonate and filtration, the solvent is removed. The 17α-ethyl-17β-acetoxy-5α,10β-estr-1-en-3-one can be further purified by chromatography over silica gel. The ultraviolet absorption spectrum shows a maximum at 230 millimicrons with a molecular extinction coefficient of about 10,050. Infrared maxima are observed at 3.34, 5.75, 5.95, and 7.9 microns.

Substitution of 3.2 parts of butyric anhydride for the acetic anhydride used in the foregoing example yields 17α-ethyl-17β-butyroxy-5α,10β-estr-1-en-3-one. The ultraviolet absorption spectrum shows a maximum at about 230 millimicrons with a molecular extinction coefficient of about 10,200.

What is claimed is:
1. A compound of the formula

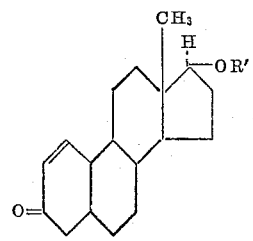

wherein R' is a member of the class consisting of hydrogen and lower alkyl-CO radicals.

2. 17β-acetoxyestr-1-en-3-one.

3. A compound of the structural formula
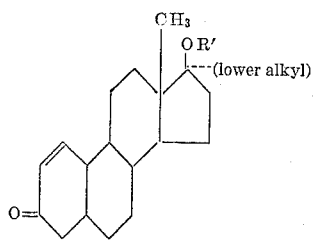
wherein R' is a member of the class consisting of hydrogen and lower alkyl-CO radicals.
4. 17α-methyl-17β-hydroxyestr-1-en-3-one.
5. 17α-ethyl-17β-hydroxyestr-1-en-3-one.
References Cited in the file of this patent
UNITED STATES PATENTS
| | | |
|---|---|---|
| 2,721,871 | Colton | Oct. 25, 1955 |
| 2,744,122 | Djerassi et al. | May 1, 1956 |
FOREIGN PATENTS
| | | |
|---|---|---|
| 107,030 | Sweden | Apr. 6, 1943 |
| 750,834 | Great Britain | June 20, 1956 |